R. B. HALL.
BATTERY PLATE.
APPLICATION FILED DEC. 16, 1918.
1,325,015.
Patented Dec. 16, 1919.
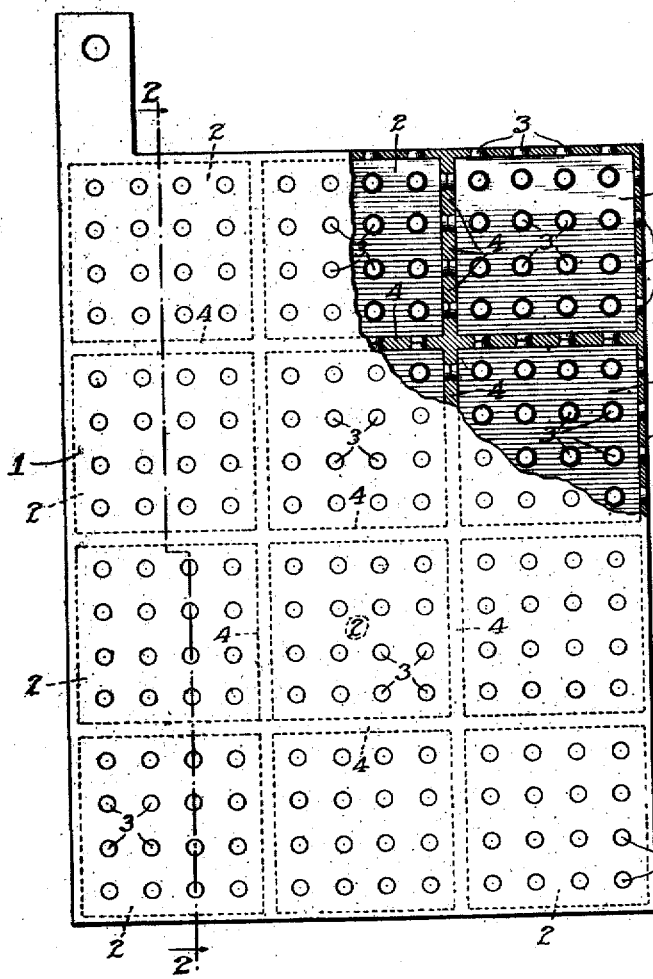
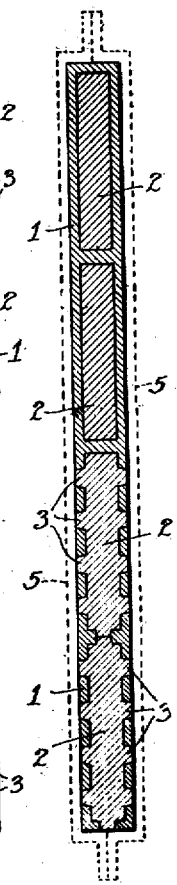
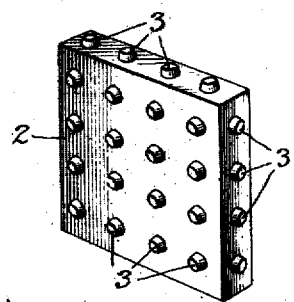
Witnesses
Martin H. Olsen
Fred M. Dovre
Inventor,
Roy Benson Hall,
By Rummler & Rummler, Attys

UNITED STATES PATENT OFFICE.

ROY BENSON HALL, OF CHICAGO, ILLINOIS.

BATTERY-PLATE.

1,325,015.     Specification of Letters Patent.     Patented Dec. 16, 1919.

Application filed December 16, 1918. Serial No. 266,857.

*To all whom it may concern:*

Be it known that I, ROY BENSON HALL, a citizen of the United States of America, and a resident of Chicago, county of Cook, and State of Illinois, have invented certain new and useful Improvements in Battery-Plates, of which the following is a specification.

This invention relates to storage battery plates, particularly the structure thereof and methods of forming same. The main objects of the invention are to provide an improved form of light weight battery plate adapted to withstand exceptionally rough usage; to provide active material units or blocks of improved form adapted for manufacturing rapidly by machinery; to provide an improved form of rigid grid or casing adapted for molding integrally, to embrace and hold such blocks; to provide a highly unified combination of such grid and blocks adapted to withstand warping or buckling; to provide a plate of the character described having stiffening ribs running both vertically and crosswise, and also having numerous points or small areas on its surface for access of the electrolyte to the active material; and to provide improved methods for forming and assembling the parts into plates.

An illustrative embodiment of this invention is shown by the accompanying drawings, in which—

Figure 1 is mainly a front elevation of a finished plate with part of the front side of the casing removed to show the active material.

Fig. 2 is a cross section on the line 2—2 of Fig. 1, a mold also being indicated by dotted lines.

Fig. 3 is a view of one of the active material units or blocks.

In the illustrative embodiment shown in the drawings, the plate as a whole comprises a perforate hollow grid or casing 1 and a plurality of blocks or pellets 2 of active material held therein.

The blocks are rectangular in shape so as to fit together readily in assembling. Each block is provided with a plurality of projections 3 on each side for exposure to the electrolyte. Projections of similar character are also provided on the edges, either for exposure to the electrolyte or for contact with corresponding projections on adjacent plates, depending on whether the edge of the block fits against an edge wall of the casing or abuts against one of the perforated transverse ribs 4 separating the blocks.

The plate is formed by assembling in symmetrical order a plurality of blocks edge to edge in a mold 5, with their edges held apart somewhat by the edge projections 3, and then pouring or forcing in the lead or alloy around the blocks to form the grid or casing. A plate as thus constructed is obviously very rigid and strong even though the walls be made very thin, the ribs 4 serving as braces and reinforcements.

The blocks 2, usually consisting of an oxid of lead may be formed or molded as a paste in any manner desired, as for instance, in a core mold, pill machine or the like, and then dried, ready for use. The precise number of projections 3 on each block and also their arrangement is immaterial, but the general style and arrangement shown is preferred. The shape of the blocks may also be varied somewhat. The plate mold 5 is so proportioned that when the same is closed, ready for securing the molded metal, the projections 3 all bear snugly against the mold excepting those on adjacent edges which abut together. When the plate is removed from the mold the distributed areas at 3 are nearly all exposed ready for action of the electrolyte, though when assembled certain of the edge projections serve merely to more uniformly interconnect the active material blocks.

The main advantage of this method of plate manufacture is that the plates can be made by machinery and in such a manner as to have the lead oxids protected and held securely in place. Another advantage is that in assembling the core in the mold, the component blocks 2 fit automatically one against another with due bonding apertures between the edge projections for the casing metal, and a plain-faced mold may be used, in which different shapes, sizes, and styles of blocks may be used. Any amount of active surface may be exposed in the plate by changing the size of the projections on the pellets. Any style of plate may be cast as the pellets are only cores.

Although but one specific embodiment of this invention has been herein shown and described, it will be understood that numerous details of the construction shown may be altered or omitted without departing from the spirit of this invention as defined by the following claims.

I claim:

1. The method of making a storage battery plate having a continuous multipartite core, which consists in forming a plurality of blocks of active material having projections distributed over their edges and faces, assembling said blocks contiguously edge to edge in a close-fitting mold and filling the mold, including the interstices between said projections, with metal whereby a casing is molded tightly about said blocks with the tips of the side projections exposed for subsequent contact with the electrolyte.

2. The process of making a battery plate, which consists in molding a plurality of active material cores in flat shape with projections on their faces, arranging said cores edge to edge in a mold having sides arranged to fit tightly against the outer faces of the core projections, then molding a grid about said cores by filling the vacant space about said cores with molten metal, and when the metal has set, removing the mold.

Signed at Chicago this 13th day of December 1918.

ROY BENSON HALL.